Feb. 5, 1957  J. N. YOUNG  2,780,112
TWO ROLLER ANTI-FRICTION LATCH
Filed May 22, 1953  3 Sheets-Sheet 1

INVENTOR.
JOSEPH N. YOUNG
BY
Roland A. Anderson
ATTORNEY

Feb. 5, 1957     J. N. YOUNG     2,780,112
TWO ROLLER ANTI-FRICTION LATCH

Filed May 22, 1953     3 Sheets-Sheet 2

INVENTOR.
JOSEPH N. YOUNG
BY
ATTORNEY

Feb. 5, 1957   J. N. YOUNG   2,780,112
TWO ROLLER ANTI-FRICTION LATCH
Filed May 22, 1953   3 Sheets-Sheet 3

INVENTOR.
JOSEPH N. YOUNG
BY
ATTORNEY

United States Patent Office 2,780,112
Patented Feb. 5, 1957

2,780,112

TWO ROLLER ANTI-FRICTION LATCH

Joseph N. Young, Chicago, Ill., assignor to the United States of America as represented by the United States Atomic Energy Commission Application May 22, 1953, Serial No. 356,775

7 Claims. (Cl. 74—527)

This invention relates to a releasable holding means and more particularly to a holding means of the latch type which is releasable with a minimum of effort.

Frequently a need arises for the use of a fastening, locking, or latching device in which a minimum of friction is created. Such a device must be positively actuated by a minimum of force and preferably in a minimum of time. For example, a minimum friction latch may be used in conjunction with a solenoid actuator which functions in a relatively short time interval. Another example where a minimum friction latch is applicable is in conjunction with the release of heavy objects that exert considerable weight upon a detent. Where a minimum of friction is evolved under such conditions it is possible to apply a small force to the latch in order to release a relatively heavy object.

Accordingly, an object of the present invention is to provide a latch having movable parts that create insignificant amounts of friction either between themselves or with the article to be released.

Other objects of the present invention will be apparent from the following description, taken in connection with the appended claims.

Figure 1:
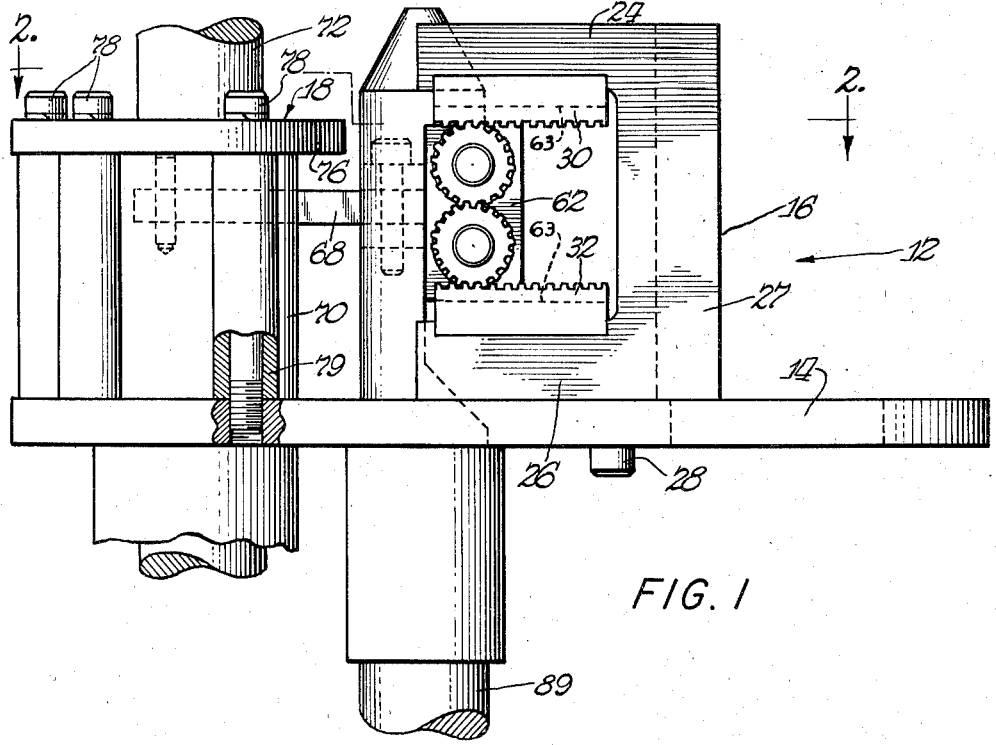
Fig. 1 is an elevational view of a latch of the present invention and a member to which the latch is applied.
Figure 2:
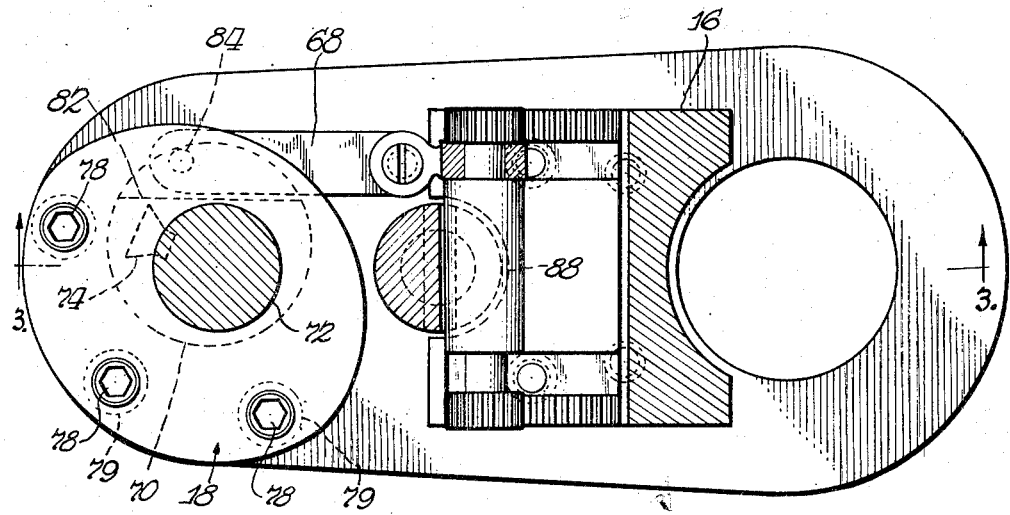
Fig. 2 is a sectional plan view taken on the line 2—2 of Fig. 1.

As shown in Fig. 1, a latch 12, which constitutes an embodiment of the present invention, has a base plate 14, a cage 16, and an actuating means 18. The cage 16 has the form of a C-shaped housing having spaced arms 24 and 26 and a portion 27 interconnecting the arms and extending transversely thereto. The cage 16 is attached to the base plate 14 by means of bolts 28.

Figure 3:
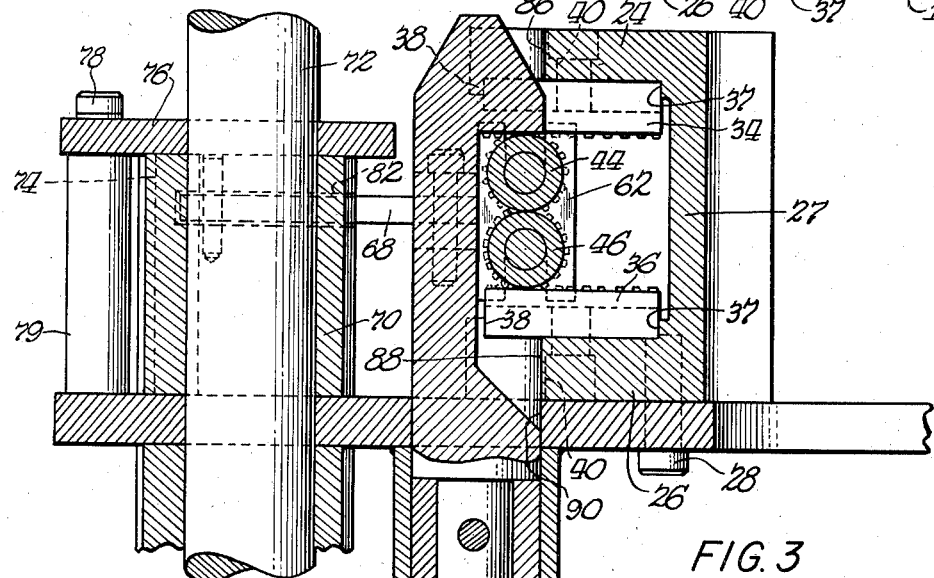
Fig. 3 is a vertical sectional view taken on the line 3—3 of Fig. 2.
Figure 7:
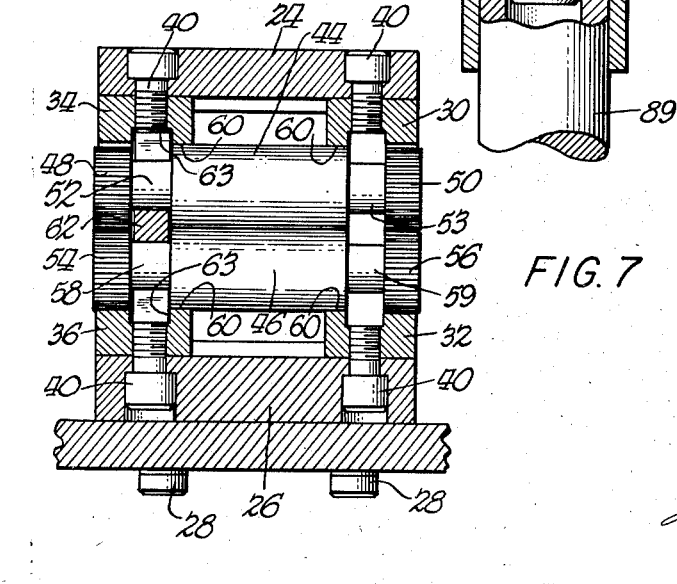
Fig. 7 is a vertical sectional view taken on the line 7—7 of Fig. 5.

As shown in Figs. 1, 3, and 7, two gear racks 30 and 32 extend along the arms 24 and 26, respectively, opposite one another at one side of the housing, and two gear racks 34 and 36 extend along the arms 24 and 26, respectively, opposite one another at the other side of the housing. The gear racks fit snugly between shoulders 37 and flanges 38 on the arms 24 and 26 and are secured to the arms by screws 40. Thus the gear racks are held against movement with respect to the housing 16.

Between the arms 24 and 26 are disposed two contacting rollers 44 and 46, as shown in Fig. 7. Pinions 48 and 50 are secured to the ends of roller 44 in spaced relation to said ends by means of reduced portions 52 and 53. Likewise, pinions 54 and 56 are secured to the ends of roller 46 in spaced relation to said ends by means of reduced portions 58 and 59. As shown in Fig. 7, the pinions 48 and 54 engage each other as well as the racks 34 and 36, respectively. Similarly, the pinions 50 and 56 engage each other as well as the racks 30 and 32, respectively. It is to be pointed out that the rollers 44 and 46 roll upon each other at their line of contact, and the end portions of the rollers roll on surfaces 60 which are formed on the racks 30, 32, 34, and 36 alongside the teeth thereof. The surfaces 60 provide support for the rollers 44 and 46 and insure contact between them at all times. Inasmuch as the rollers are cylindrical, the distance between the surfaces 60 on the racks 34 and 36 is equal to that between the similar surfaces on the racks 30 and 32.

Figure 6:
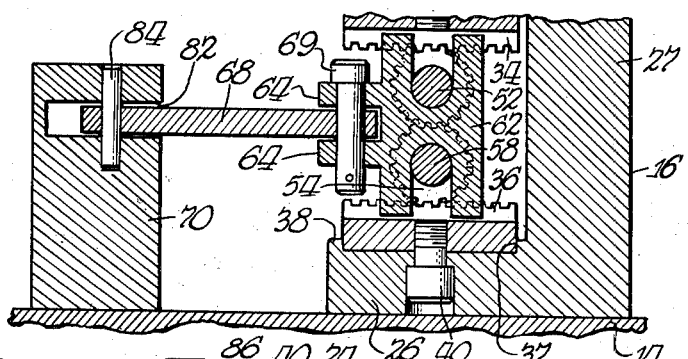
Fig. 6 is a vertical sectional view taken on the line 6—6 of Fig. 5.

As shown in Fig. 6, an H-shaped element 62 has its ends disposed in channels 63 formed in the upper and lower racks 34 and 36 and embraces the reduced portions 52 and 58 attached to the rollers 44 and 46. The element 62 on its side remote from the connecting portion 27 of the cage 16 has spaced ears 64 which receive between them a link 68, which is connected thereto by a pin 69 passing through the ears and the link. The link 68 is adapted to move the element 62 to the right and left as viewed in Fig. 6 in a manner to be described hereinbelow. The rolls 44 and 46 are held against substantial longitudinal movement with respect to one another and with respect to the racks 30, 32, 34, and 36 by the element 62, because it extends into the spaces formed at the reduced portions 52 and 58 between the pinions 48 and 54 and the rolls 44 and 46 and is substantially as thick as these spaces are wide, and because the ends of the element 62 which extend into the grooves 63 formed in the racks 34 and 36 are substantially as thick as the grooves 63 are wide.

The actuating means 18 includes a sleeve 70 which is attached to an elongated rotatable shaft 72 by means of a set screw 74 and serves as a crank. The sleeve 70 is located between the base plate 14 and a plate 76 which is attached to the base plate in spaced relation thereto by means of screws 78 and spacing sleeves 79 mounted thereon, which have a length approximately equal to that of the sleeve 70. The sleeve 70 has a slot 82 in which the connecting link 68 is anchored by means of a pin 84.

Figure 4:
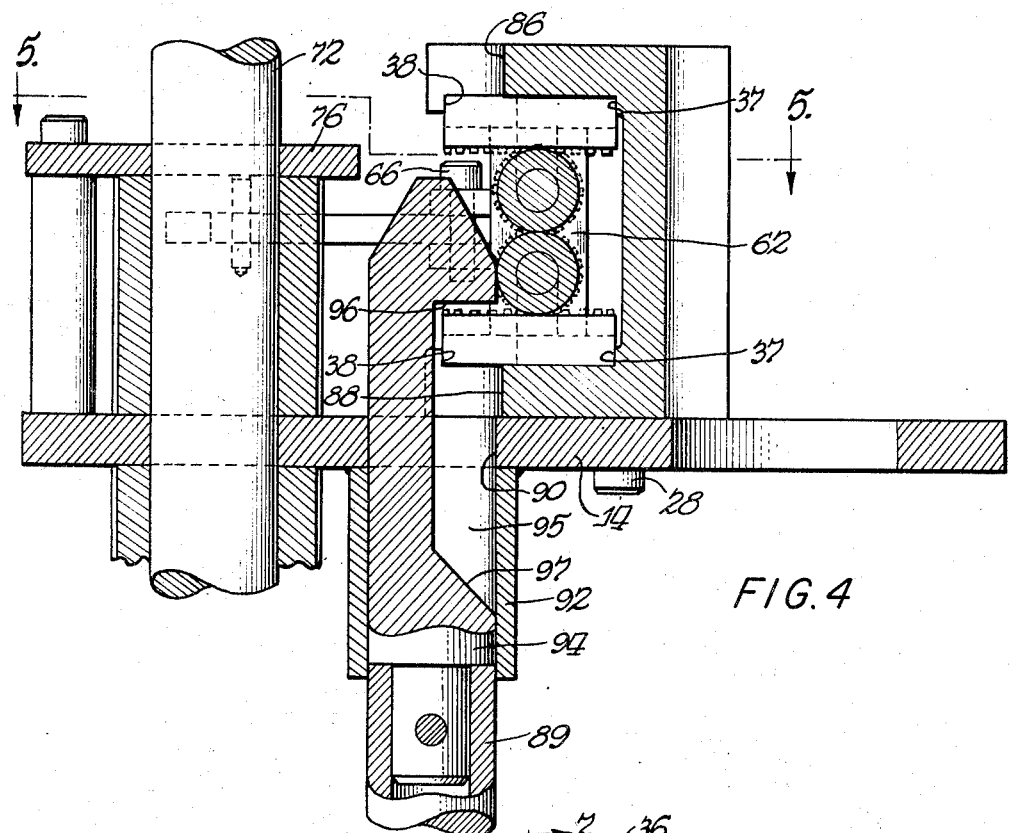
Fig. 4 is a vertical sectional view similar to Fig. 3 but showing the parts in a different position.
Figure 5:
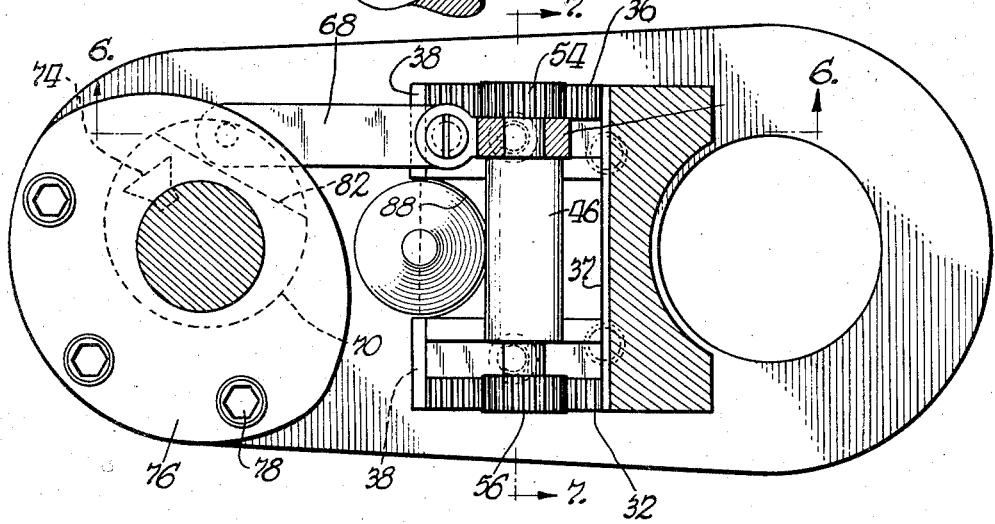
Fig. 5 is a sectional view taken on the line 5—5 of Fig. 4.

As shown in Figs. 3, 4, and 5, the ends of the arms 24 and 26 remote from the connecting portion 27 of the cage 16 are provided with arcuate recesses 86 and 88, respectively, which provide room for a member 89 with which the rollers 44 and 46 are to cooperate. The member 89 has a sliding fit in an aperture 90 in the base plate 14 and a short sleeve 92 which is secured to the surface of the plate 14 away from the cage 16 in a conventional manner such as welding. The member 89 has a head 94 which is provided with an elongated recess 95 which has an end surface 96 transverse or perpendicular to the direction of sliding of the member 89 on the sleeve 92 and an end surface 97 oblique or inclined to said direction of sliding.

In Fig. 3 the rollers 44 and 46 lie in the recess 95 of the member 89, and the end surface 96 of the recess engages the roller 44. Thus the member 89 is prevented from moving in the direction that appears as downward in Fig. 3. The force that acts to move the member 89 in this direction may be considerable and is applied against the roller 44, which in turn applies the force against the mating roller 46, which in turn applies the force to the surfaces 60 on the racks 32 and 36. However, when the member 89 is to be permitted to move in the aforesaid direction, the shaft 72 is moved angularly in the proper direction and acts through the link 68 and the H-element 62 to shift the rollers 44 and 46 transversely out of the recess 95. The pinions 48, 50, 54, and 56, secured to the rollers, force the rollers to rotate as they move transversely. In rotating the rollers roll upon one another and upon the end surface 96 of the recess 95 and on the surfaces 60 of the racks 32 and 36. Very little effort will be required to move the rollers out of the recess in spite of any large force applied by the end surface 96 of the recess to the roller 44, since the various surfaces through which the force exerted on the member 89 is transmitted roll upon one another.

As previously stated the force exerted on the member 89 in the direction that appears as downward in Fig. 3 may be considerable. For example, if this direction is actually downward, the member 89 may be long and heavy or may support a heavy object. If this direction is upward or horizontal, a considerable spring force or electromagnetic force may be urging the member 89 in the direction in question. In any event, the force required to move the rollers 44 and 46 out of the recess 95 will be relatively small, in view of the rolling action between the surfaces of the rollers and end surface 96 of the recess and surfaces 60 of racks 32 and 36 through which the longitudinal force applied to member 89 is applied. Consequently, the member 89 can be quickly and easily released for movement.

The present application illustrates an embodiment in which only two rollers 44 and 46 are employed. Any even number of rollers may be used, for the various rollers can transmit force to and roll upon one another, and the surfaces of the first and last rollers must move in the same direction along the end surface 96 of the recess 95 and the surfaces 60 of the racks 32 and 36.

The engagement of the pinions 48, 50, 54, and 56 with one another and with the racks 30, 32, 34, and 36 causes the rolls 44 and 46 to move together and to remain in rolling contact when force is applied to move either roll. The element 62, by engaging both rolls at the reduced portions 52 and 58, insures that force will be applied simultaneously to both rolls to move them, rather than to one roll alone. Consequently, the force to move the rolls will not be transmitted to one roll alone and thence through the pinions to the other roll. This avoids the need for excessive or needless application of force which might be required because of the tendency of the pinions to jam occurring when the moving force is transmitted through the pinions.

The intention is to limit the invention only within the scope of the appended claims.

What is claimed is:

1. In combination, a member movable in a certain direction and having a surface normal to said certain direction of movement, and a latch comprising a cage, and an even number of rollers movably mounted in the cage and rolling on one another and on oppositely disposed surfaces on the cage, one roller having rolling contact with said surface of the member when moved thereacross.

2. In combination, a member movable in a certain direction and having a surface normal to said certain direction of movement, and a latch comprising a cage and a pair of rollers mounted in the cage so as to be movable with respect thereto in a direction transverse to said certain direction of movement, by rolling on one another and on oppositely disposed surfaces on the cage, one roller having rolling contact with said surface of the member thereacross.

3. In combination, a member movable in a certain direction and having a surface normal to said certain direction of movement, and a latch comprising a cage, a pair of racks mounted in opposed relation in the cage, and two rollers rolling on one another and having pinions at their ends meshing with one another and with the racks, one roller having rolling contact with the said surface of the member when moved thereacross, the other having rolling contact with the cage.

4. In combination, a member movable in a certain direction having a surface normal to said certain direction of movement, and a latch comprising a cage, a pair of racks mounted in opposed relation in the cage, two rollers rolling on one another and having pinions at their ends meshing with one another and with the racks, one roller making rolling contact with said surface, the other roller making rolling contact with the cage, and means for moving the rollers simultaneously to bring said one roller into and out of contact with said surface, said means including an element embracing both rollers so as to transmit force conjointly to both rollers.

5. In combination, a member movable in a certain direction having a surface normal to said certain direction of movement, and a latch comprising a cage, a pair of racks mounted in opposed relation in the cage and having grooves, and two rollers rolling on one another and having pinions at their ends meshing with one another and with the racks, the rollers also having reduced portions adjacent the pinions on corresponding ends, one roller making rolling contact with said surface on the member, the other roller making rolling contact with the cage, and means for moving the rollers simultaneously to bring said one roller into and out of contact with said surface, said means including an element embracing the reduced portions of both rollers so as to transmit force conjointly to both rollers and riding in the grooves in the racks.

6. A latch comprising a cage, a pair of racks mounted in opposed relation in the cage and having grooves, and two rollers rolling on one another and having pinions at their ends meshing with one another and with the racks, the rollers also having reduced portions adjacent the pinions on corresponding ends, one roller making rolling contact with the cage, and means for moving the rollers simultaneously, said means including an element embracing the reduced portions of both rollers so as to transmit force conjointly to both rollers and riding in the grooves in the racks.

7. A latch comprising a cage, a pair of racks mounted in opposed relation in the cage, two rollers rolling on one another and having pinions at their ends meshing with one another and with the racks, one roller making rolling contact with the cage, and means for moving the rollers simultaneously, said means including an element embracing both rollers so as to transmit force conjointly to both rollers.

References Cited in the file of this patent

UNITED STATES PATENTS

| | | |
|---|---|---|
| 338,640 | Kintner | Mar. 23, 1886 |
| 673,655 | Hoersch | May 7, 1901 |
| 1,581,439 | Gray | Apr. 20, 1926 |
| 1,766,183 | Mealia | June 24, 1930 |
| 2,275,740 | De Oslow | Mar. 10, 1942 |
| 2,579,218 | Van Deventer | Dec. 18, 1951 |